United States Patent [19]

Millner

[11] 4,268,095
[45] May 19, 1981

[54] MAGNETIC BEARING

[75] Inventor: Alan R. Millner, Lexington, Mass.

[73] Assignee: Massachusetts Institute of Technology, Cambridge, Mass.

[21] Appl. No.: 965,234

[22] Filed: Dec. 1, 1978

[51] Int. Cl.³ .............................................. F16C 39/06
[52] U.S. Cl. ...................................................... 308/10
[58] Field of Search .......................................... 308/10

[56] References Cited

U.S. PATENT DOCUMENTS

| 3,865,442 | 2/1975 | Studer | 308/10 |
| 3,877,761 | 4/1975 | Boden | 308/10 |
| 3,890,019 | 6/1975 | Boden | 308/10 |
| 3,954,310 | 5/1976 | Rava | 308/10 |
| 4,077,678 | 3/1978 | Studer | 308/10 |
| 4,090,745 | 5/1978 | Dohogne | 308/10 |

Primary Examiner—R. Skudy
Attorney, Agent, or Firm—Thomas V. Smurzynski; Arthur A. Smith, Jr.

[57] ABSTRACT

Two parallel rings are secured to a rotating shaft. A stationary central ring is located between the other two rings, creating parallel air gaps. The central ring includes a radially magnetized permanent magnet creating parallel magnetic circuits across the air gaps. Conductive coils are located on either side of the permanent magnet and arranged to carry current in the same direction. When energized by a control circuit, the conductors create a magnetic field that adds to the magnetic field across one gap and subtracts from the field across the other, providing an axial force on the shaft.

11 Claims, 3 Drawing Figures

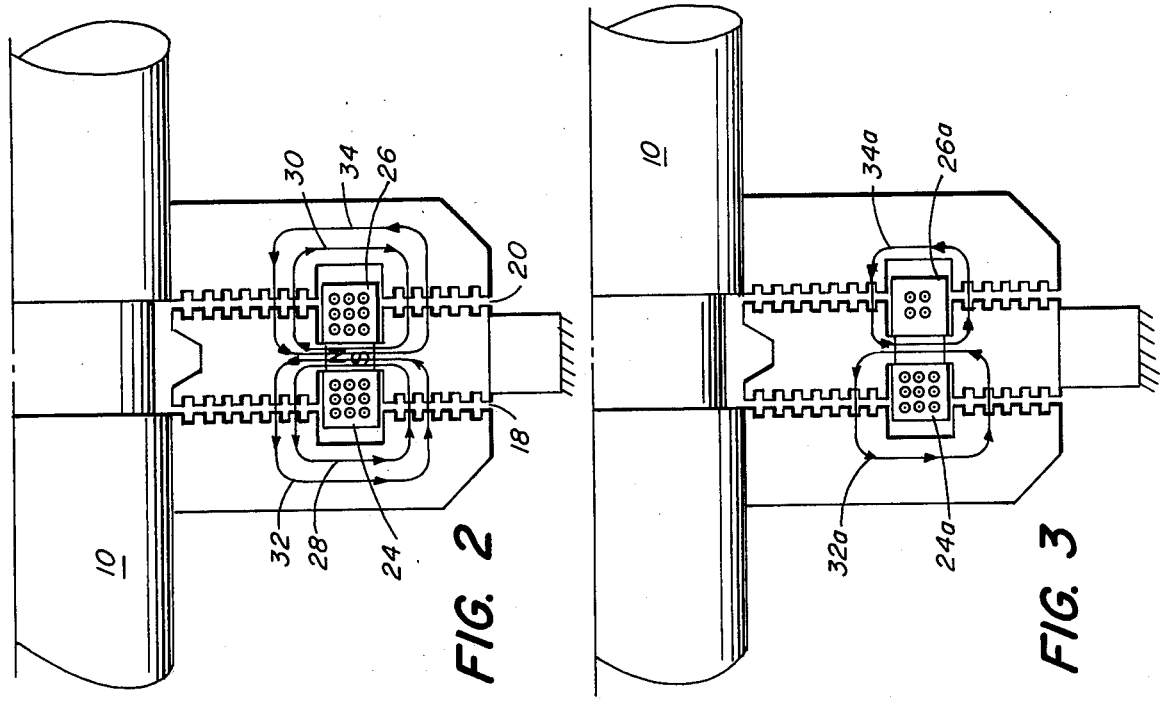
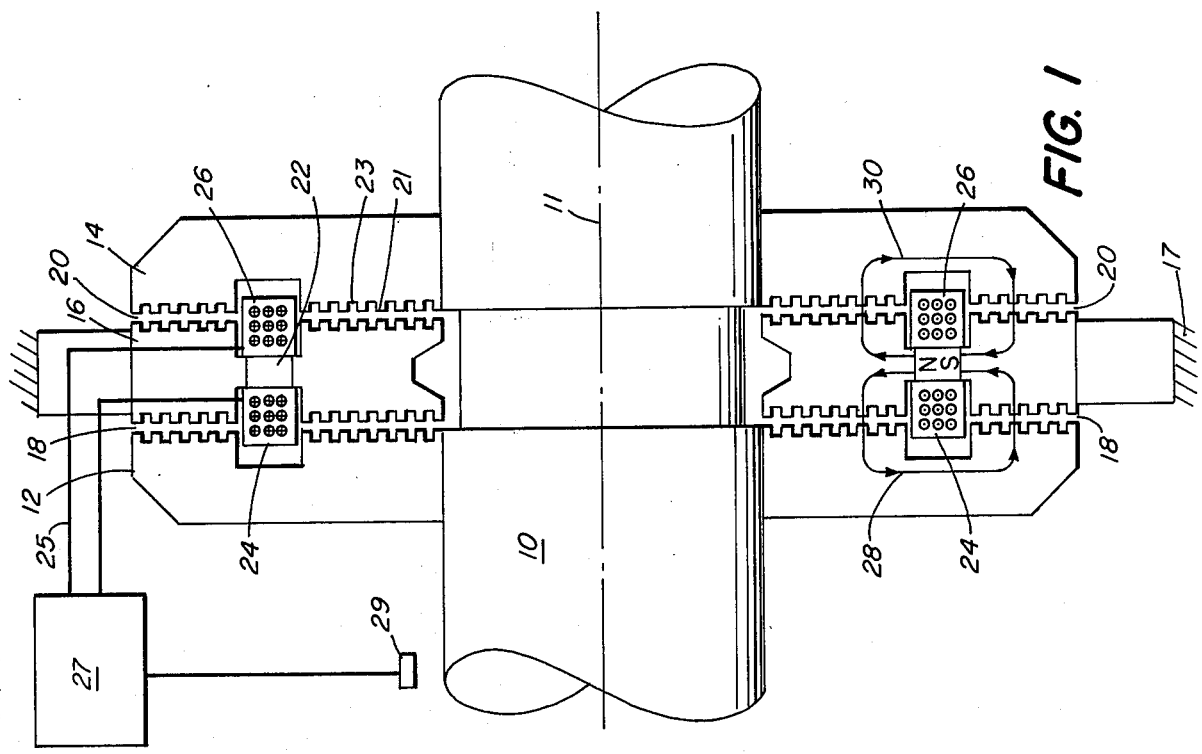
FIG. 2
FIG. 3
FIG. 1

MAGNETIC BEARING

The Government has rights in this invention pursuant to Contract No. AF19(628)-78-C-0002 awarded by the U.S. Department of the Air Force.

BACKGROUND OF THE INVENTION

This invention relates to magnetic bearings and particularly to magnetic bearings providing for passive radial centering and active axial control.

In order to support certain high-speed spinning assemblies with minimum wear and maximum life and reliability, magnetic bearings have been developed. Typically, a combination of permanent magnets and electromagnets exerts passive stabilizing forces and active control. A good magnetic bearing emphasizes the following features: large radial and axial force per unit weight, low power consumption, simple magnetic and mechanical construction, minimum use of expensive rare earth magnet material, mechanical integrity at high speeds, and provision for the damping of oscillation.

Accordingly, it is an object of the invention to provide a magnetic bearing that satisfies the above-described requirements of magnetic bearing design, especially those for simple construction, light weight and low power consumption.

SUMMARY OF THE INVENTION

The invention includes two magnetically permeable elements, and movable between them a central magnetically permeable element, so that air gaps are defined between the central element and the first and second elements. A magnet is mounted in the central element with its axis arranged to create parallel magnetic circuits traversing both air gaps. A pair of electrical conductors are located on opposing sides of the magnet, arranged to carry current in the same direction and perpendicularly to the magnetic axis of the magnet. The conductors are connectable to a voltage source so that when they are carrying current, the conductors create magnetic fields that oppose each other in the vicinity of said magnet, add to the strength of the magnetic field across one of the gaps, and subtract from the strength of the magnetic field across the other of said gaps.

DESCRIPTION OF THE DRAWING

FIG. 1 is a cross-sectional view of a magnetic bearing embodying the invention, showing the magnetic circuit generated by the permanent magnet;

FIG. 2 is a detail view of the same bearing, showing the control coils energized, and the resulting magnetic field;

FIG. 3 is a detail view of the same bearing, showing the magnetic field that results when the current in the two control coils are different.

DETAILED DESCRIPTION OF THE PREFERRED EMBODIMENT

FIG. 1 shows the rotatable shaft of rotor 10 of some assembly (not shown) which requires that the rotor 10 be maintained in a radially centered position about an axis 11, and be axially controlled by a control circuit. The shaft may be of a non-magnetic material. Mounted on the shaft 10 are two outside rings 12, 14, made of a magnetically permeable material such as maraging steel.

A central stator ring 16 is located between the rotor rings 12, 14. The stator ring 16 is also made of a magnetically permeable material, in the embodiment, silicon iron. Stator ring 16 is connected to some fixed surface, shown diagrammatically in FIG. 1 at 17. Air gaps are formed between the rings. Air gap 18 is defined between the stator ring 16 and rotor ring 12, and an air gap 20, parallel to the other, is similarly defined between central stator ring 16 and rotor ring 14. The surfaces of the rings facing each other across air gaps 18 and 20 are machined into fringing rings 21 with slots 23.

The central stator ring 16 includes a permanent magnet 22, a relatively small piece of samarium-cobalt in the form of a radially magnetized ring. The magnetic axis of magnet 22 lies in the radial direction. In the embodiment shown, its North magnetic pole is shown closer than the South pole to the axis 11. The axis may be reversed, but it must be parallel to the air gaps 18 and 20. Control coils 24 and 26 are loops of electrical conductor located on either side of permanent magnet 22. In the embodiment shown in FIG. 1, there are an equal number of turns in each coil and the coils are connected in series and arranged so that the currents in both coils 24, 26 travel in the same direction and perpendicularly to the axis of magnet 22. The electrical connections 25 to the coils are shown, somewhat diagrammatically, connected to a feedback circuit 27. The feedback circuit 27 is shown connected to a sensor 29 that senses the axial position of shaft 10.

With no current in the control coils 24, 26, the magnetic field created by the permanent magnet divides equally into parallel magnetic circuits 28 and 30 that traverse the two air gaps 18 and 20 respectively. The magnetic field thus created passively centers the bearing radially, and the equilibrium established thereby is stable in the radial direction. Copper wire may be inserted into the slots 23 between the fringing rings 21 to give passive radial damping.

Although the axial magnetic forces exerted by the magnet 22 on rotor rings 12 and 14 are equal, equilibrium in the axial direction is unstable.

Axial adjustment is maintained by the control coils 24 and 26 as shown in FIG. 2. With equal current flowing in the control conductor coils, in the same direction, equal magnetic circuits 32 and 34 are created. As can be seen from FIG. 2, the magnetic fields created by the control coils in the vicinity of the permanent magnet 22 oppose each other, and since they are equal, cancel each other. In the air gaps 18 and 20, the circuits 32 and 34 have different effects on the flux in the gaps. As shown in FIG. 2, for example, across gap 18, circuit 32, representing the magnetic forces generated by coil 24, adds to the magnetic force generated by magnet 22, indicated by magnetic circuit 28. Across gap 20, on the other hand, circuit 34 indicates that the magnetic force generated by coil 26 opposes, and hence subtracts from, the force indicated by circuit 30.

Active feedback circuit 27 controls the current in the coils and provides the axial positioning and damping capability. In ways well known to those skilled in the art and not described here in detail for purposes of emphasizing the invention, the circuit 27 includes a sensor 29 that senses the axial position of shaft 10 and supplies the conductor of coils 24 and 26 via connections 25 with current adequate to restore the axial position in response. Since the permanent magnetic flux need not be changed with this bearing geometry, the control coil current need not counteract high magnetic reluctance of the magnet and so lower power and lighter coils are required.

The control coils and permanent magnet are on the stationary member and are not subject to centrifugal forces as the elements of the bearing rotate relative to each other.

An alternative embodiment of the invention shown in FIG. 3 includes radial active control. Normally the control coils are operated with equal current, as by connecting them in series, shown in the embodiment just described. However, if radial control is required, it can be accomplished by introducing a difference in the two currents, changing the total magnetic flux and changing the strength of the radial centering forces. Referring to FIG. 3, there is shown the same configuration of the bearing as in the previous embodiment, except that the currents in the control coils 24a and 26a are different, shown diagrammatically by a fewer number of dots in the illustration of coil 26a than in coil 24a. Electrically induced magnetic circuit 32a, generated by coil 24a, is shown larger than magnetic circuit 34a generated by coil 26a, to indicate the greater force of the magnetic field. The differences in strength of the magnetic field change the strength of the radial centering forces. This can be used for radial active damping or increased stiffness at, however, some penalty in power dissipation.

Applications of the magnetic bearing shown here include spacecraft momentum or energy storage wheels, gyroscopes, energy storage flywheels for transportation applications, peak power leveling flywheel devices for electrical utilities, high-speed motors or pumps, or solar of wind energy storage devices. Materials and the details of the mechanical construction of the bearing shown may be altered for particular applications. Such variations are contemplated and anticipated, and considered to fall within the scope of the invention, as set forth in the following claims.

I claim:
1. A magnetic bearing comprising:
   a magnetically permeable central element having a magnet mounted on said central element,
   outside magnetically permeable elements, movable relative to said central element, located on either side of said central element, forming air gaps between said central element and said outside elements,
   said magnet having a single magnetic axis parallel to said air gaps and being arranged to create parallel magnetic circuits, one across each said gap, to exert magnetic forces between said central element and said outside elements,
   two parallel electrical conductors, located on opposing sides of said magnet, both arranged to carry current in the same direction and perpendicularly to the magnetic axis of said magnet, said conductors having electrical connection means for connection to a source of voltage so that when so connected and conducting current, said conductors create magnetic fields that oppose each other in the vicinity of said magnet, add to the strength of the magnetic field across one of said gaps, and subtract from the strength of the magnetic field across the other of said gaps to adjust the relative magnetic forces created by said permanent magnet between said central and said outside elements.

2. The magnetic bearing of claim 1 in which said bearing is symmetrical on either side of a plane extending through the center line of said central element.

3. The magnetic bearing of claim 1 in which said conductors are connected in series.

4. The magnetic bearing of claim 1 in which said conductors have electrical connection means for connection to a source of voltage so that one conductor can carry a different current than the other.

5. The magnetic bearing of claim 1 in which conductors are arranged to carry the same amount of current.

6. The magnetic bearing of claim 1 in which said central element and said outside elements are a central ring and two outside rings parallel to said central ring.

7. The magnetic bearing of claim 6 in which said magnet is a permanent magnet, radially magnetized.

8. A magnetic bearing comprising:
   a magnetically permeable central element, having a magnet mounted on said central element,
   two outside magnetically permeable control elements, located on either side of said central element, forming two air gaps between said central element and said outside elements, said air gaps being substantially parallel to each other,
   said magnet being arranged to have its magnetic axis parallel to said air gaps, so that it creates parallel magnetic circuits, one across each said air gap,
   two parallel electrical conductors, each located between said magnet and one of said air gaps, both arranged to carry current in the same direction, and perpendicularly to the magnetic axis of said magnet, said conductors being connected in series and having electrical connection means for connection to a voltage source so that when connected and conducting current, said conductors create magnetic fields that cancel each other in the vicinity of said magnet, add to the strength of the magnetic field across one of said gaps, and subtract from the strength of the magnetic field across the other of said gaps.

9. The magnetic bearing of claim 8 including a control circuit means connected to said electrical connection means for controlling the current in said conductors, said control circuit means being responsive to the relative movement of said central and outside elements.

10. A magnetic bearing comprising:
    a magnetically permeable central element having a magnet mounted on said central element,
    outside magnetically permeable elements, movable relative to said central element, located on either side of said central element, forming air gaps between said central element and said outside elements,
    said magnet being arranged to create parallel magnetic circuits, one across each said gap,
    two parallel electrical conductors, located on opposing sides of said magnet, both arranged to carry current in the same direction and perpendicularly to the magnetic axis of said magnet, said conductors having electrical connection means for connection to a source of voltage so that when so connected and conducting current, said conductors create magnetic fields that oppose each other in the vicinity of said magnet, add to the strength of the magnetic field across one of said gaps, and subtract from the strength of the magnetic field across the other of said gaps, and
    a control circuit means connected to said electrical connection means for controlling the current in said conductors, said control circuit means being responsive to the relative movement of said central and outside elements.

11. The magnetic bearing of claim 10 in which said conductors are two coils, having an equal number of turns, connected in series.

* * * * *